(12) United States Patent  (10) Patent No.: US 6,216,731 B1
Frenkel                    (45) Date of Patent:     Apr. 17, 2001

(54) HYDRAULIC DIAPHRAGM-ACTUATED VALVE

(75) Inventor: Boris Frenkel, Netania (IL)

(73) Assignee: Rafael Magofim (1975) LTD, Or Akiva (IL)

( * ) Notice: Subject to any disclaimer, the term of this patent is extended or adjusted under 35 U.S.C. 154(b) by 0 days.

(21) Appl. No.: 09/346,701

(22) Filed: Jul. 2, 1999

(30) Foreign Application Priority Data

Feb. 7, 1998 (IL) .................................... 125196/2

(51) Int. Cl.[7] .................................... F16K 37/00
(52) U.S. Cl. ..................... 137/556; 251/61.2; 251/335.2; 92/99
(58) Field of Search .................. 251/331, 61.1, 251/61.2, 61.3, 61.4, 335.2; 137/553, 556, 556.3; 92/99, 98 R

(56) References Cited

U.S. PATENT DOCUMENTS 2,537,308 * 1/1951 Hansen ............................. 251/331 X
3,026,909 * 3/1962 Boteler ............................. 251/331 X
3,762,681   10/1973 McKinney et al. .
5,554,014 * 9/1996 Becker ................................ 92/99 X
5,724,881   3/1998 Reynolds .

OTHER PUBLICATIONS

"The BERMAD 700 Series Control Valve—Basic Information", BERMAD CO.—Catalogue.

* cited by examiner

Primary Examiner—Kevin Lee

(57) ABSTRACT

A hydraulic diaphragm-actuated valve has an elastic diaphragm for operation of the pressure-controlled valve, and the diaphragm includes an outer rim configured for being clamped between opposed rigid surfaces, an intermediate flexible portion connected to the outer rim, and a rigid central portion having an outside diameter extending between 0.6 to 0.8 of the radial extent of the intermediate flexible portion from the center of the diaphragm. An inner portion is integrally connected to the intermediate flexible portion, and envelopes at least a part of the rigid central portion, and serves for attachment thereto.

15 Claims, 6 Drawing Sheets

HYDRAULIC DIAPHRAGM-ACTUATED VALVE

BACKGROUND AND PRIOR ART

The present invention relates to flow control of fluids by a diaphragm valve.

More particularly, the invention provides a pressure controlled, diaphragm operated valve, and a diaphragm for use in said valve having an extended operating life. The present invention is however not concerned with valves of the type where the diaphragm is used directly in contact with and to control flow of the fluid being controlled, such valves being limited to pressures of approximately 4 kg/sq cm or less.

The primary advantage of diaphragm operated valves relative to spool operated valves lies in their prevention of any leakage of the fluid being handled, which leakage can occur in other valves through the spool gland. The diaphragm which moves the valve stem can itself be operated by mechanical, electrical or fluid pressure means, the latter method being particularly advantageous as adequate valve operation forces even for large valves can easily be applied, and the pressurized liquid or gas passing through the valve can itself be utilized for this purpose, thus eliminating the necessity of providing some outside energy source. Where some external power source is used for operating the diaphragm a different advantage is achieved—the diaphragm is isolated from the fluid being handled, which valve can then be used for fluids of a type which would chemically attack the diaphragm were it to be in contact therewith.

Diaphragms are commonly made of natural or synthetic rubber, and may be textile reinforced, and teflon coated. Diaphragms are subject to flexing during operation, and have a finite operating life eventually requiring their replacement, which is preferably carried out before failure as part of a preventive maintenance program. An extended operating life of the diaphragm is of course highly desirable, and is essential in valves which are frequently operated.

Applicants market a valve described in this company's catalogue "Raphael, diaphragm actuated valves series—V". which comprises a body, cover, a control unit with a compression spring, a shut-off disk and a valve status indicator. This indicator is rigidly attached to the valve stem by a nut with slots.

The valve is operated by directing the fluid being handled to either side of the diaphragm.

The control unit includes lower and upper covers having an elastic diaphragm disposed therebetween. Metal disks are mounted on both sides of the diaphragm, the upper disk acting as a seating for said spring which operates the diaphragm under low or zero pressure. The diaphragm and both its disks are mounted on the stem also carrying the shut-off disk. The diaphragm of this valve is designed in accordance with US Pat. No. 3,762,681 to McKinney et al, and is reinforced with cotton or nylon.

A disadvantage of the described valve is that under conditions of low pressure differential and low flow rates, axial stem vibrations occur as a result of instability between the fluid pressure and the force exerted by the compression spring. Such vibrations are damaging to the flexible diaphragm and shorten its operating life.

Similar vibrations occur when the shut-off disk is 5–10 mm from closure. Such vibrations generate unwanted noise as well as causing the premature destruction of the diaphragm.

A further disadvantage resulting from the use of said compression spring is that its resistance must be overcome by the fluid being passed by the valve, resulting in undesirable pressure drop when fluid flows through the open or partially open valve.

The status indicator of the valve is attached to the valve stem in a rigid manner which causes alignment problems with regard to the sleeve bearing and seals through which it projects.

The BERMAD CO., in their catalogue "BERMAD, Control Valves, Model 700" describe a valve of a generally similar type, except that the compression spring is disposed between the shut-off disk and the diaphragm. The BERMAD valve suffers from the same disadvantages described above. Additionally, should the compression spring fail and need replacement, the pipeline must be shut off for dismantling of the valve during repair.

OBJECTS OF THE INVENTION

It is therefore one of the objects of the present invention to obviate the disadvantages of prior art diaphragms and valves and to provide a diaphragm and valve which operate for a longer period and do not give rise to vibration, the diaphragm being formed so as to eliminate the need for a metal compression spring.

It is a further object of the present invention to prolong the life of the flexible diaphragm by controlling undesired flexure modes, and eliminating flexure in its central portion.

SUMMARY OF THE INVENTION

The present invention achieves the above objects by providing an elastic diaphragm for operation of a pressure-controlled valve, said diaphragm comprising an outer rim configured for being clamped between opposed rigid surfaces, an intermediate flexible portion connected to said outer rim, a rigid central portion having an outside diameter of between 0.6 to 0.8 of the outer part of said intermediate flexible portion. An inner flexible portion is connected to the intermediate flexible portion and envelopes at least a part of the rigid central portion and serves for attachment thereto.

In a preferred embodiment of the present invention there is provided an elastic diaphragm wherein said flexible portion is provided with a plurality of radial ribs, formed to retain the rigid central portion in a plane displaced from the plane containing the outer rim, when the diaphragm is in its free state.

In a most preferred embodiment of the present invention there is provided a pressure-operated valve provided with a diaphragm wherein said diaphragm is connected to the main valve stem. The ribs cause the diaphragm to open the valve under zero pressure conditions. A closed chamber formed adjacent to the upper major face of the diaphragm is provided with a connector port which can be connected to a small valve for selectively directing fluid pressure to said closed chamber for closing of the valve. No metal spring is used.

Yet further embodiments of the invention will be described hereinafter.

In U.S. Pat. No. 5,724,881 Reynolds describes and claims an assembly for a two-piece diaphragm, an outer plate engaging an overlay diaphragm disposed between the outer plate and back-up diaphragm, this being disposed between the overlay diaphragm and an inner plate. Inner and outer plates are held by a central stud, and are connected by a screw through a radially spaced hole.

In contradistinction thereto, the present invention provides a diaphragm wherein an inner flexible portion divides to envelope at least a part of the rigid central portion for attachment thereto, without requiring fasteners and their holes which weaken the diaphragm.

It will thus be realized that the novel diaphragm of the present invention serves for operating a diaphragm valve without requiring a metal compression spring, whereby a possible source of destructive vibration is entirely eliminated. Furthermore, the large rigid central part of the diaphragm eliminates possible unbalanced sideways flexure of the diaphragm in use, thus further prolonging its operating life.

Experimental work has been carried out on the embodiment described with reference to FIG. 4. It has been verified by testing that the thickened portions of the ribs do indeed stabilize the rib while the diaphragm undergoes flexing during normal use, yet the thickened portions do not cause an excessive increase in flexure resistance.

BRIEF DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the Drawings.

DETAILED DESCRIPTION

Figure 1:
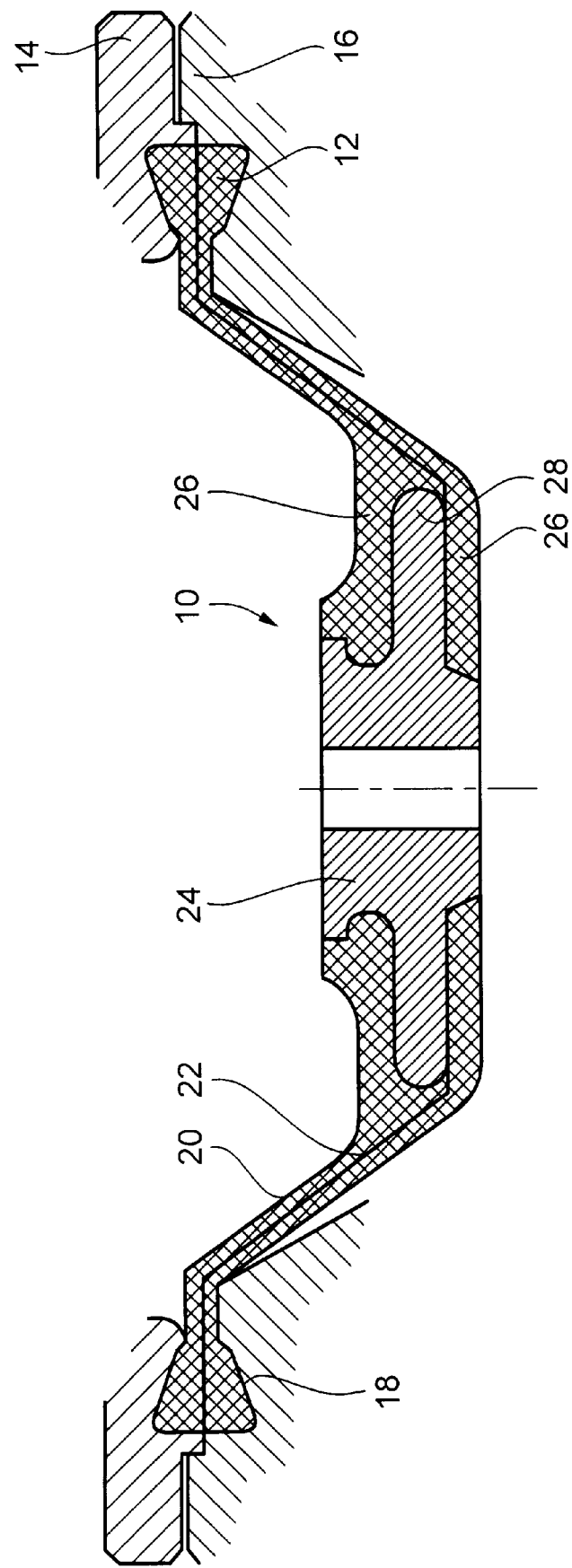
FIG. 1 is a cross-sectional elevational view of a preferred embodiment of the diaphragm according to the invention.
Figure 5:
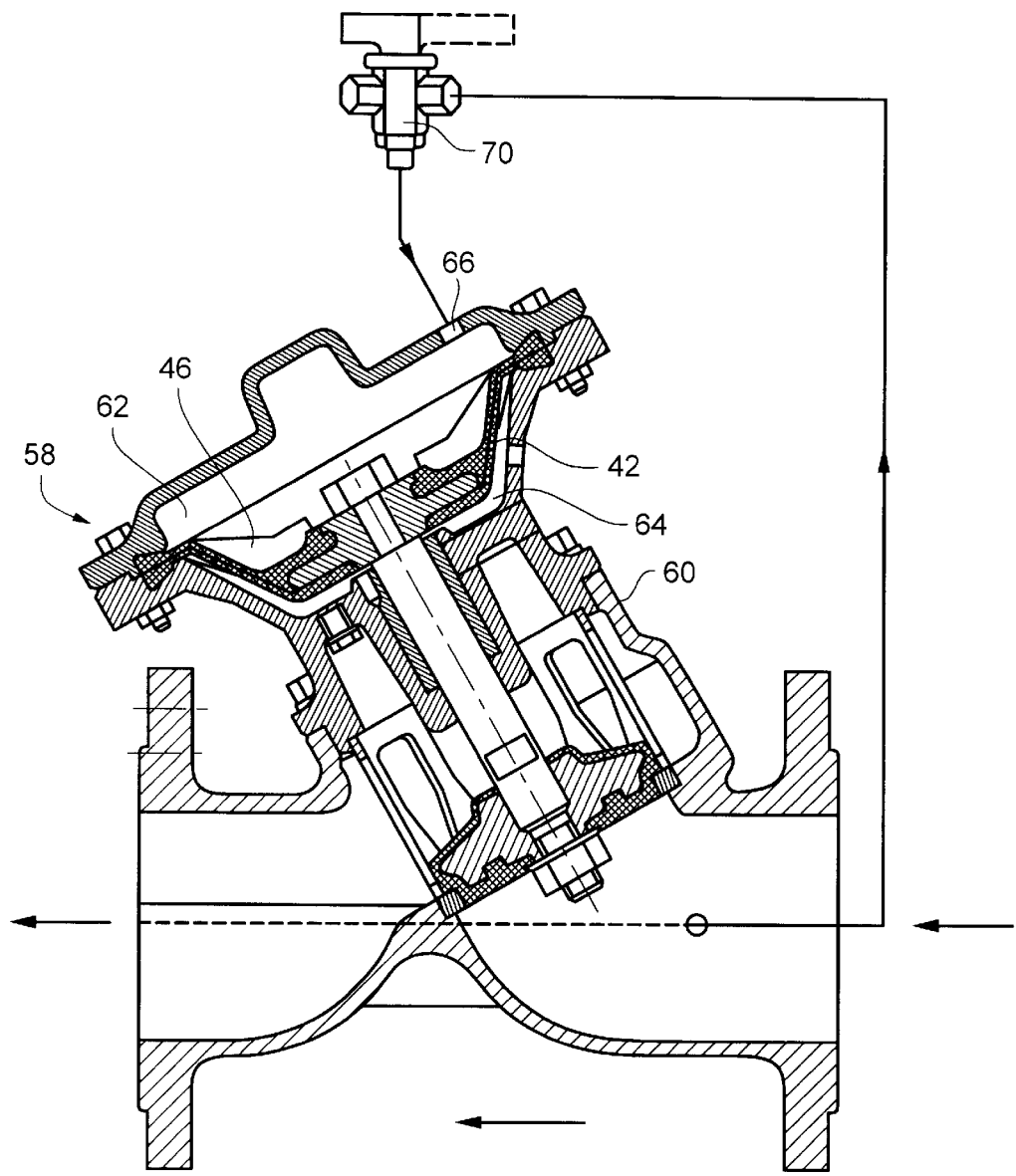
FIG. 5 is a cross-sectional elevational view of a preferred embodiment of the valve according to the invention.

There is seen in FIG. 1 an elastic diaphragm 10, suitable for operation of a pressure-controlled valve of the type seen in FIG. 5. The main part of the diaphragm 10 is suitably made of a natural or synthetic rubber. Rubbers having outstanding flexure resistance are preferred, such as natural polyisoprene, isobutener isoprene, and chlorinated isobutene isoprene.

An outer rim 12 configured for being clamped between opposed rigid surfaces 14, 16 has a dovetail shape 18 to give a firm grip. Thus the use of fasteners through the outer rim 12 is eliminated, as is the need for high compression forces.

An intermediate flexible portion 20 is in a preferred embodiment, integrally connected to the outer rim 12. This is the portion of the diaphragm undergoing flexure during use. For extra strength the flexible portion 20 is provided with an embedded flexible reinforcing layer 22, for example a cotton or nylon fabric.

A rigid central portion 24 has an outside diameter extending between 0.6 to 0.8 of the radial extent of the intermediate flexible portion 20 from the center of the diaphragm, and can be made of a metal or a plastic.

An inner flexible portion 26 of the rubber is in a preferred embodiment, integrally connected to the intermediate flexible portion 20 and attaches to and envelopes at least the outer part 28 of the rigid-central portion 24.

With reference to the rest of the figures, similar reference numerals have been used to identify similar parts.

Figure 2:
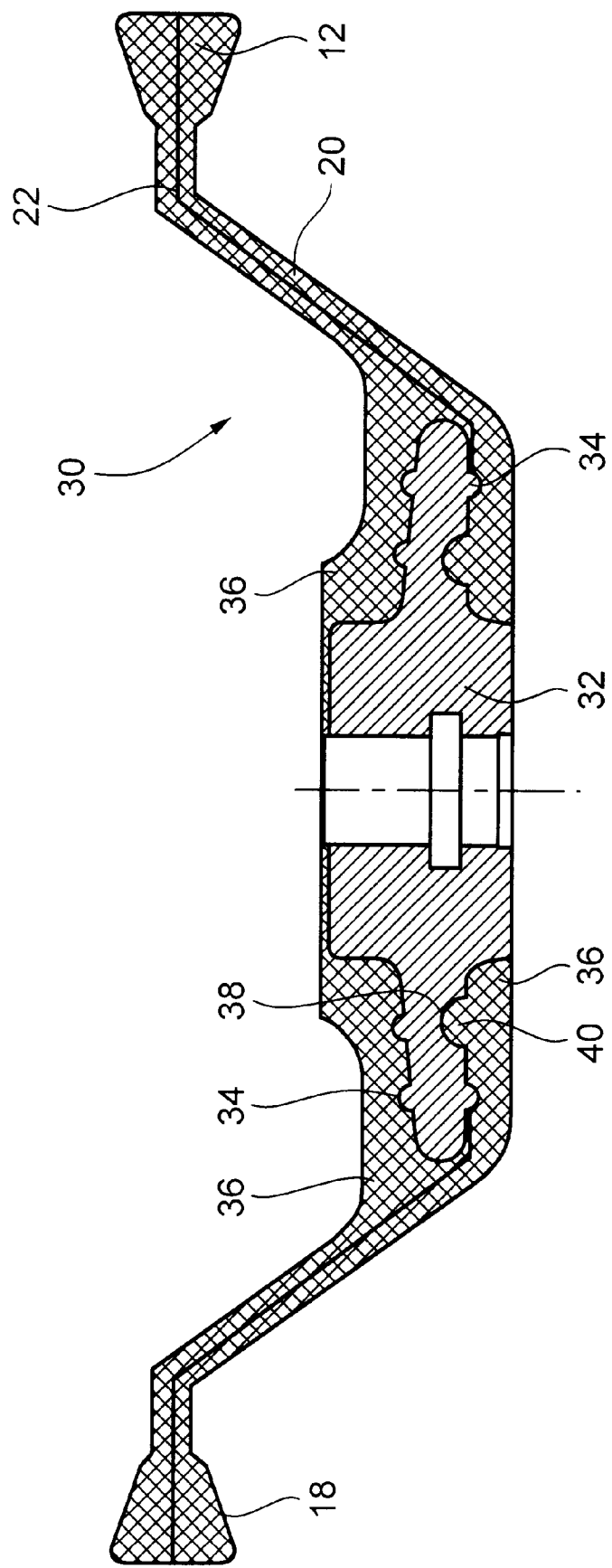
FIG. 2 is a cross-sectional elevational view of a second embodiment of the diaphragm.

Referring now to FIG. 2, there is seen an embodiment of the elastic diaphragm 30 having improved attachment to its rigid central portion 32.

The rigid central portion 32 is provided with projections 34 which enter the inner flexible portion 36 to enhance interconnection between said parts 32,36.

Similarly, the rigid central portion 32 is provided with recesses 38 which allow entry of corresponding projections 40 in the inner flexible portion 36 for the same purpose.

Figure 3:
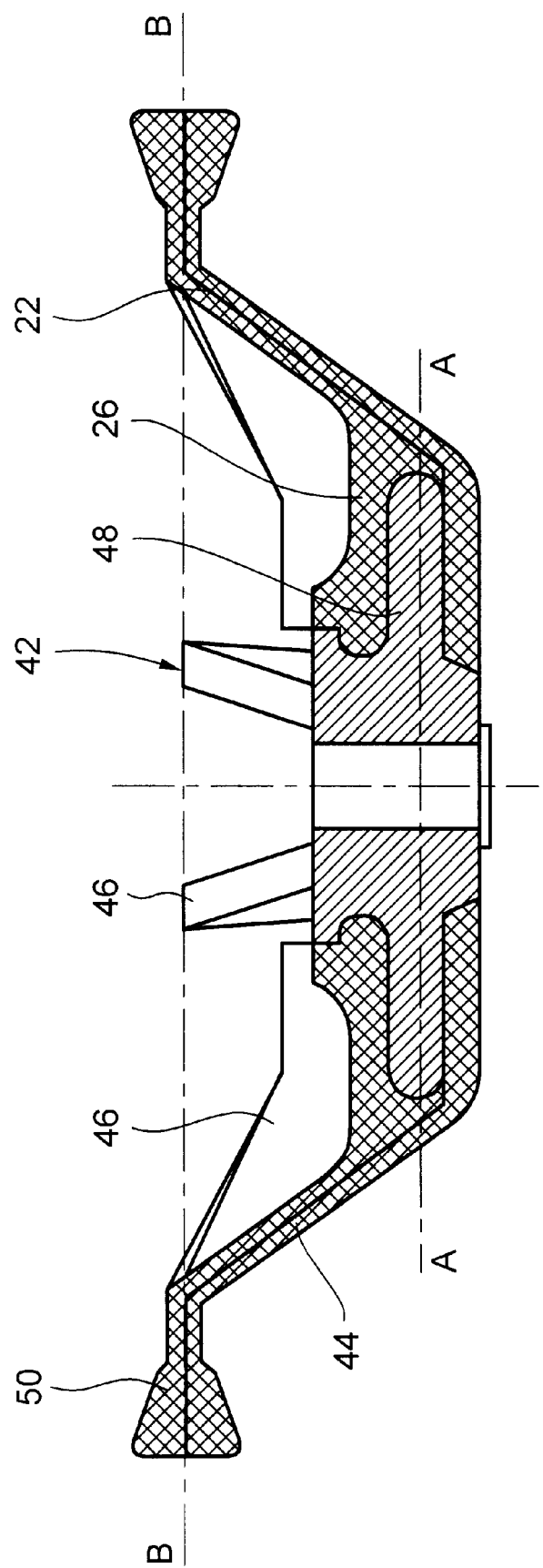
FIG. 3 is a cross-sectional elevational view of a third embodiment of the diaphragm.

FIG. 3 illustrates an embodiment of the elastic diaphragm 42 which makes possible the elimination of any metal spring.

The flexible portion 44 of the diaphragm is provided, on its upper side, with a plurality of radial ribs 46. The ribs 46 are formed to retain the rigid central portion 48 in a plane AA displaced from the plane BB containing the outer rim 50, when diaphragm 42 is in its free state. The ribs 46 are sized to allow diaphragm flexing while keeping imposed strain within the limit allowed by the rubber material, typically several hundred percent.

Figure 4:
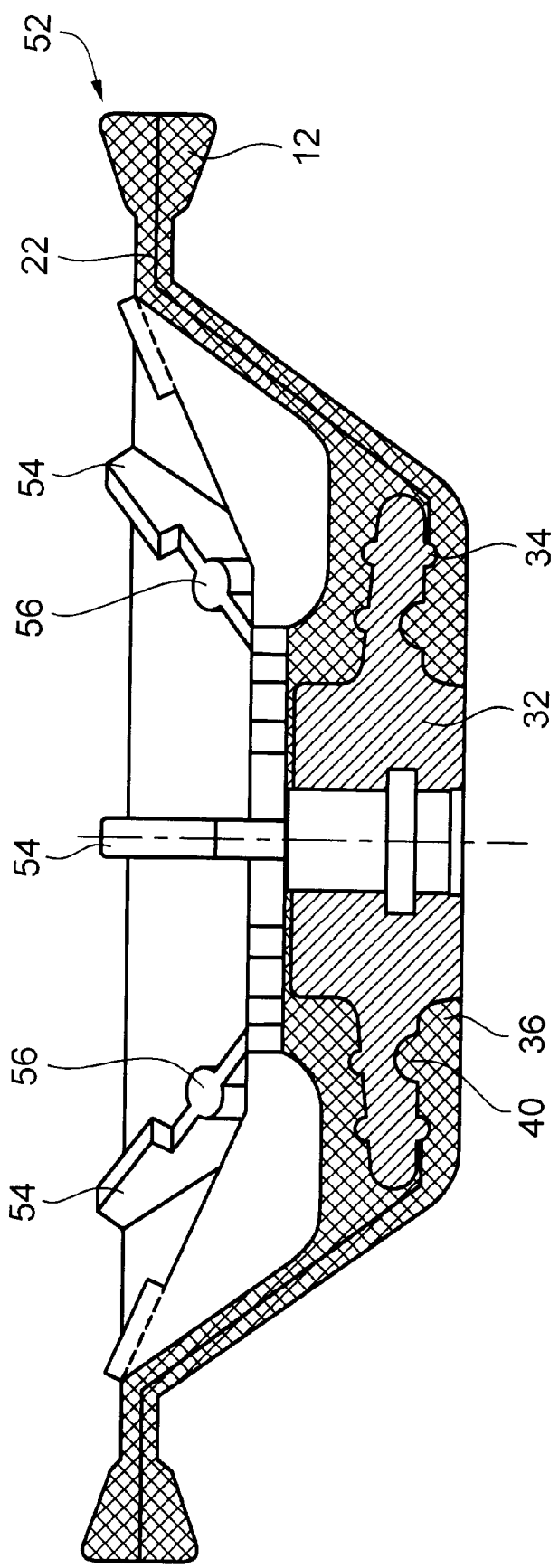
FIG. 4 is a cross-sectional elevational view of a fourth embodiment of the diaphragm.

Seen in FIG. 4 is an embodiment of the elastic diaphragm 52 similar to 30 and 42 described with reference to FIGS. 2 and 3.

However, each alternate radial rib 54 is provided with at least one thickened portion 56 preventing side collapse of ribs 54 when the diaphragm 52 undergoes flexing during operation. Large diaphragms having long ribs are provided with several thickened portions 56.

Referring now to FIG. 5, there is depicted a pressure-operated valve 58 provided with a diaphragm 42 as seen in FIG. 3. The diaphragm 42 is connected to the main valve stem 60.

The ribs 46 cause the diaphragm 42 to open the valve 58 under zero pressure conditions. A closed chamber 62 formed adjacent to the upper major face of the diaphragm 42 is provided with a connector port 66 which is connected to a small valve 70 for selectively directing fluid pressure to closed chamber 62 for closing of the valve 58. A chamber 64 open to the atmosphere is formed on the lower sided of the diaphragm 42. No metal spring is needed.

Figure 6:
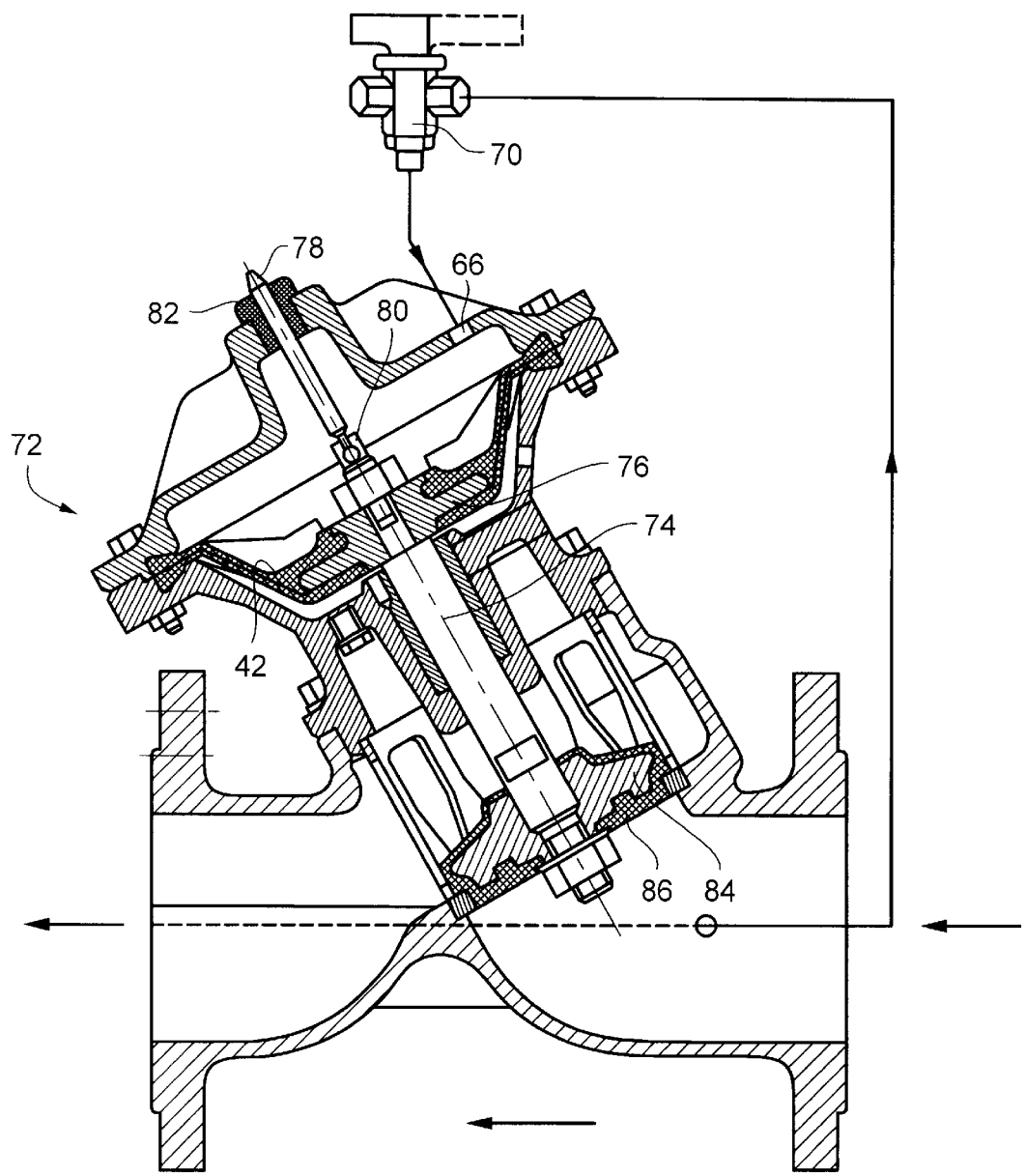
FIG. 6 is a cross-sectional elevational view of a second embodiment of the valve.

FIG. 6 shows a second valve embodiment 72 of the pressure operated valve seen in FIG. 5.

The main stem 74 projects through the rigid central portion 76.

The valve 72 is further provided with a position indicator rod 78 connected by a ball joint 80 to the extremity of main stem 74. Indicator rod 78 is supported in a bearing 82 and visibly projects outside bearing 82. The ball joint 80 prevents possible misalignment of the indicator rod 78 which would cause accelerated bearing wear.

The valve shut-off block comprises a metal core 84 enveloped by an elastomer 86 shaped to engage the recesses and project.

The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

What is claimed is:

1. An elastic diaphragm for operation of a pressure-controlled valve, said diaphragm comprising:
   an outer rim configured for being clamped between opposed rigid surfaces,
   an intermediate flexible portion integrally connected to said outer rim,
   a rigid central portion having an outside diameter extending between 0.6 to 0.8 of a radial extent of said intermediate flexible portion measured from a center of the elastic diaphragm to an outermost part of said intermediate flexible portion, and
   an inner flexible portion integrally connected to said intermediate flexible portion and enveloping at least a part of said rigid central portion for attachment thereto,
   wherein the elastic diaphragm is connected to a main valve stem of the pressure operated valve.

2. The elastic diaphragm as claimed in claim 1, wherein said rigid central portion includes projections designed and adapted to engage said inner flexible portion to enhance interconnection between said rigid central portion and said inner flexible portion.

3. The elastic diaphragm as claimed in claim 1, wherein said rigid central portion includes recesses adapted to receive corresponding projections from said inner flexible portion to enhance interconnection between said rigid central portion and said inner flexible portion.

4. The elastic diaphragm as claimed in claim 1, wherein said intermediate flexible portion further comprises an embedded flexible reinforcing layer.

5. The elastic diaphragm as claimed in claim 1, wherein said intermediate flexible portion further comprises a plurality of radial ribs arranged on an upper major face thereof so as to retain said rigid central portion in a plane displaced from a different plane containing said outer rim when said elastic diaphragm is in a free state, and to allow the elastic diaphragm to flex during operation.

6. The elastic diaphragm as claimed in claim 5, wherein each of said plurality of radial ribs includes at least one thickened portion preventing a side collapse of said plurality of radial ribs when said elastic diaphragm flexes during operation.

7. A pressure operated valve having an elastic diaphragm as claimed in claim 5, wherein said diaphragm is connected to the main valve stem, and wherein said plurality of radial ribs cause the elastic diaphragm to open said valve under a zero pressure condition, and where a closed chamber formed adjacent to the upper major face of said diaphragm has a connector port connected to a valve for selectively directing fluid pressure to said closed chamber for closing of said pressure operated valve.

8. A pressure-operated valve as claimed in claim 7, having the main valve stem projecting through said rigid central portion, said pressure operated valve further comprising a position indicator rod connected by a ball joint to an extremity of said main valve stem, said position indicator rod being supported in a bearing and visibly projecting outside of said bearing.

9. The elastic diaphragm of claim 1, wherein said outer rim has a dovetail shape in a cross-section and said opposed rigid surfaces are adapted to grip the dovetail shaped outer rim.

10. The elastic diaphragm of claim 1, wherein the outside diameter is larger than a thickness of said rigid central portion.

11. The pressure operated valve of claim 7, further comprising a chamber having an opening in communication with an external atmosphere, said chamber being bounded on one side by a lower face of the intermediate flexible portion opposed to said upper major face.

12. A hydraulic actuated, pressure controlled valve, comprising:
   a diaphragm attached to a first end of a main valve stem projecting through a rigid central portion of the diaphragm;
   an inner flexible portion attached to said rigid central portion;
   an outer rim having a dovetail shape configured for being clamped between opposed rigid surfaces, said outer rim being free of any fasteners passing therethrough;
   an intermediate flexible portion spanning said inner flexible portion and said outer rim, said intermediate flexible portion having a plurality of radial ribs extending on a first surface thereof between said rigid central portion and said outer rim,
   said plurality of radial ribs urging a surface of said rigid central portion into a first plane displaced from a second parallel plane containing said outer rim when the pressure controlled valve is open and in an unpressurized state;
   a closed chamber enclosing said first surface and having a port connected to a control valve for selectively applying a fluid pressure to said closed chamber to pressurize and close the pressure controlled valve;
   an open chamber enclosing a second surface of said intermediate flexible portion opposed to the first surface, said open chamber having an opening therein communicating with an external atmosphere; and
   a valve shut-off block connected to a second end of said main valve stem so that said diaphragm is separated from a flowpath of a fluid controlled by the pressure controlled valve.

13. The pressure controlled valve of claim 12, further comprising at least one thickened portion on each of said plurality of radial ribs adapted to prevent a side collapse of said plurality of radial ribs when said diaphragm flexes during operation.

14. The pressure controlled valve of claim 12, wherein a separation between said first plane and said second parallel plane changes when the pressure controlled valve changes from the unpressurized state to a pressurized state to close the pressure controlled valve.

15. The pressure controlled valve of claim 12, wherein said intermediate flexible portion further comprises an embedded flexible reinforcing layer.

* * * * *